Figure 1:
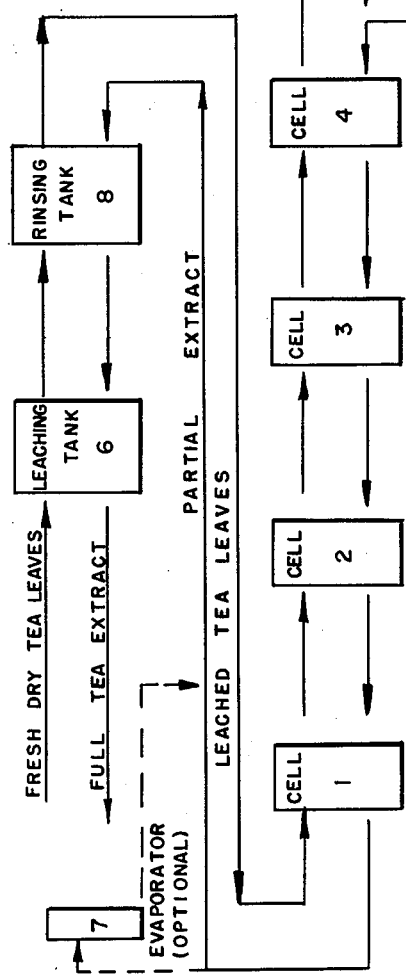

March 5, 1963 M. BONOTTO 3,080,237
METHOD FOR PRODUCING A CONCENTRATED TEA EXTRACT
Filed Feb. 24, 1960 2 Sheets-Sheet 1

INVENTOR
MICHELE BONOTTO
BY Cushman, Darby & Cushman
ATTORNEYS

March 5, 1963 M. BONOTTO 3,080,237
METHOD FOR PRODUCING A CONCENTRATED TEA EXTRACT
Filed Feb. 24, 1960 2 Sheets-Sheet 2
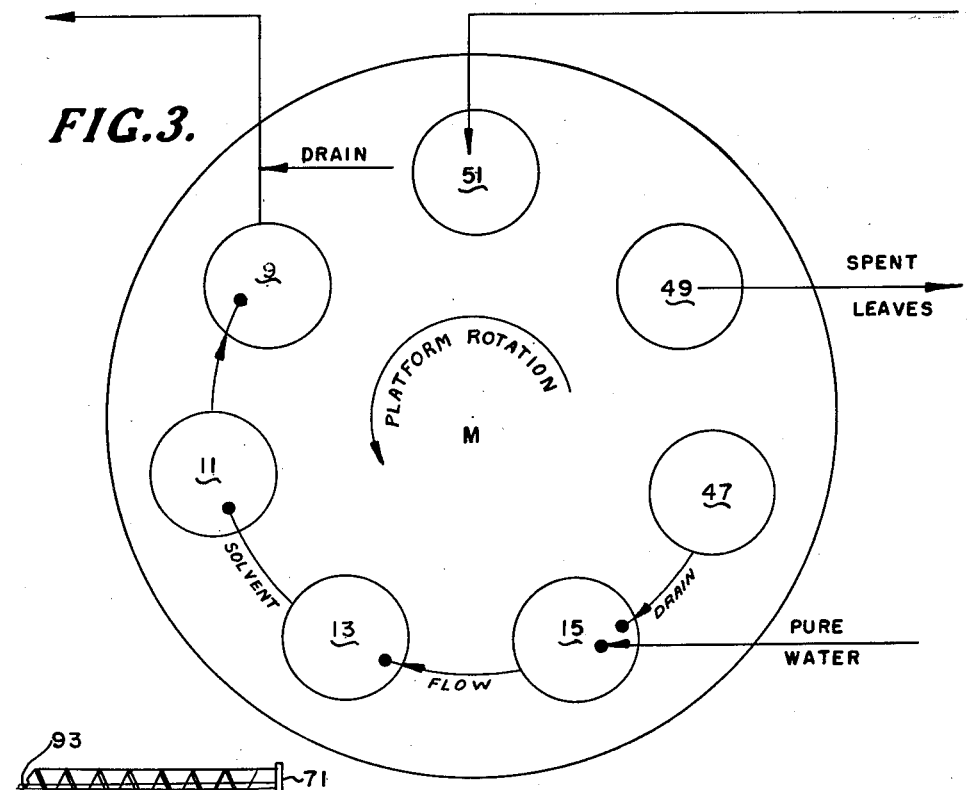
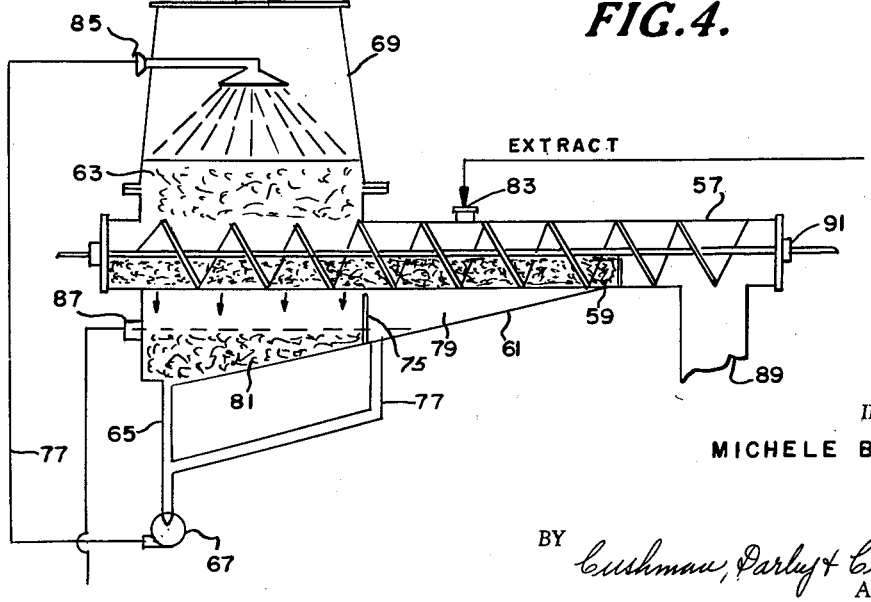
INVENTOR
MICHELE BONOTTO United States Patent Office 3,080,237
Patented Mar. 5, 1963

3,080,237
METHOD FOR PRODUCING A CONCENTRATED TEA EXTRACT
Michele Bonotto, Princeton, N.J., assignor, by mesne assignments, to Tea Corporation, Baltimore, Md., a corporation of Maryland
Filed Feb. 24, 1960, Ser. No. 10,729
5 Claims. (Cl. 99—77)

The present invention relates to a new method for producing a highly concentrated tea extract from tea leaves, and to the improved extract resulting therefrom. More particularly, the invention relates to a highly concentrated tea extract comprising an extract derived from a surface extraction or leaching of the solubles that coat the tea leaves, combined with a tea leaf extract containing the more stable soluble components present within the tea leaf structure. This combination of extracts constitutes a so-called "instant tea" which, when diluted with water, results in a tea beverage of enhanced aroma, flavor and body characteristics corresponding closely to those possessed by freshly brewed tea.

It should immediately be noted that the invention represents a novel radical departure from former "ins'ant tea" processes and products, because the final tea extract contemplates a highly concentrated combination of extracts obtained respectively from the surface coating of the tea leaves and from within the same. This method results in the attainment of concentrated tea extract without danger of destruction and dissipation of natural volatile complex compounds and other constituents which contribute to the aroma and flavor characteristics of the ultimate "cup of tea." As will be fully explained hereinafter, a final highly concentrated tea extract is obtained of far richer flavor and aroma characteristics than realized by prior processes wherein a concentrated tea extract was obtained by extracting both surface and inner tea leaf solubles without relying upon selective extraction thereof, followed by evaporation.

Various methods have been utilized in the past for the preparation of a fully flavored extract from tea leaves. In this respect, the solubles which are extracted from tea leaves can be divided into two basic groups, to wit, the ones coating the surface of the leaves, which contribute to the delicate aroma, flavor and color characteristics of the final tea brew, and those within the tea leaves, which mainly give characteristic body and astringency to the brew. The first group includes very volatile compounds particularly sensitive to high temperature treatments, whereas the second group is quite stable at high temperatures.

In prior methods, it was never recognized that tea solubles could be selectively treated as in my invention, to yield a highly concentrated extract without damaging the volatile constituents defined heretofore. Rather, concentration of an extract containing all of the solubles had been achieved by evaporation with accompanying dissipation of the above-mentioned volatile substances.

Compare the above with my novel process which yields a final highly concentrated extract, including both the more stable solubles within the tea leaves that account for the basic body and astringency of tea, and the highly volatile solubles found in the surface coating of the tea leaves. The process contemplates the utilization of selective extraction techniques in order to obtain a final extract of high concentration or density capable of producing an improved "cup of tea" by the addition of water.

In view of the foregoing, the primary object of this invention is to produce a highly concentrated, fully flavored tea extract from tea leaves by a process which results in retention of tea flavor and aroma to a far greater degree than was achieved by processes heretofore employed.

Another object of this invention is to provide a process for producing a highly concentrated, fully flavored tea extract from tea leaves whereby substantially all of the constituents which impart characteristic color and flavor to a cup of tea and contribute to the characteristic aroma of a cup of tea, are retained in the final extract.

A further object of this invention is to provide a process for producing a highly concentrated, fully flavored tea extract from tea leaves which comprises supplying a batch of fresh, dry tea leaves, subjecting said tea leaves to leaching with an aqueous leaching agent of concentrated tea extract, leaching out the soluble solids coating the surface of said tea leaves, and withdrawing as an end product a highly concentrated, fully flavored tea extract containing said soluble solids, and the volatile compounds contained therein.

An additional object of this invention is to provide a process for producing a highly concentrated, fully flavored tea extract from tea leaves which comprises supplying batches of leached tea leaves, successively subjecting said batches to countercurrent equilibrium solvent extraction thereby obtaining a tea extract of given concentration containing less volatile solubles from within the tea leaves, treating batches of fresh, dry tea leaves with said tea extract to thereby leach out the surface coating of soluble solids on such fresh, dry tea leaves and yield as an end product a concentrated tea extract of enhanced flavor, color and aroma characteristics.

Still another object of this invention is to provide a process for producing a highly concentrated, fully flavored tea extract which comprises obtaining a first tea extract of given concentration by extracting the same from tea leaves, applying said tea extract to a batch of fresh, dry tea leaves until such tea leaves exhibit a tendency to absorb said first tea extract resulting in incipient uncurling and swelling of the tea leaves thereby leaching out the surface coating thereon, and thereafter withdrawing the resulting tea extract containing the solubles present in the first tea extract and enriched by the surface coating leached out from the fresh, dry tea leaves.

An additional object of the invention is to provide a process as described heretofore wherein a reducing atmosphere is created during the leaching out step thereby minimizing the oxidation of volatile flavors and aromas present in the surface coating being leached out.

Another object of the invention is to produce a water soluble, highly concentrated and fully flavored tea extract composed of a portion of an extract containing the more stable less volatile solubles from within the tea leaf structure and contributing to astringency and body of tea, and a portion of an extract leached out from fresh, dry tea leaves and containing the less stable volatile solubles from the surface of the tea leaves, which contribute to flavor, color and aroma.

Other and further objects of the invention will be in part apparent and in part set out in the detailed description of the several steps in the process which follows.

Figure 2:
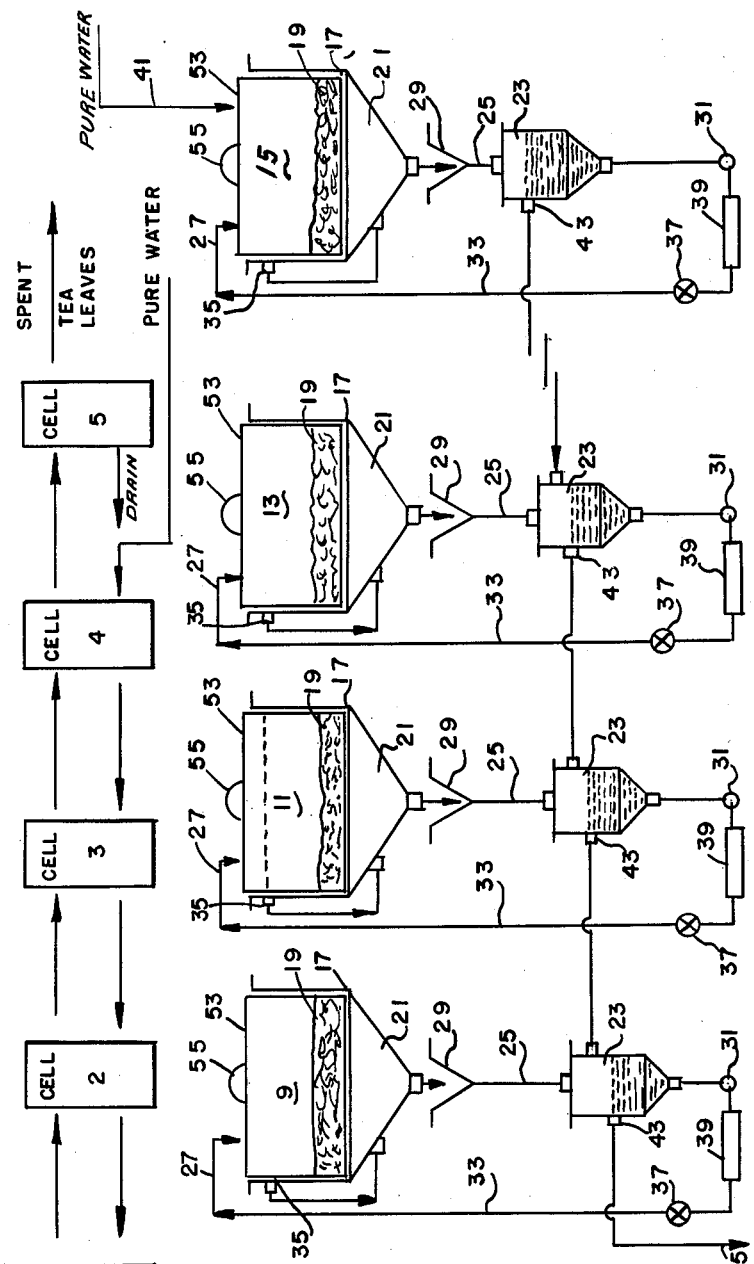

Referring to the accompanying drawings:
FIGURE 1 illustrates a flow diagram of the preferred sequence of steps comprising the process;
FIGURE 2 illustrates one form of countercurrent equilibrium extraction apparatus for application of my invention to a continuous process;
FIGURE 3 illustrates a rotating platform usable in conjunction with the apparatus of FIGURE 2; and
FIGURE 4 illustrates one modification of a combination leaching and rinsing apparatus.

As noted heretofore, the present-day techniques for making pure tea extracts have yielded only a relatively low concentration of tea solids on the order of from about 4 to 9%, thus necessitating either the use of additives or a further concentration step, to obtain a sufficiently high concentration extract. In this respect, a liquid extract suitable for reduction to powder form must be in the neighborhood of 25 to 35% solids and a liquid extract for individual addition to water to produce a cup of tea requires a concentration of at least 50% solids.

By my technique of selective extraction of tea leaves, it is possible to have a direct extract containing an unprecedented amount of tea solids without resorting to evaporation of the entire extract as was done heretofore. Prior art relating to solvent extraction of tea leaves all contemplated an aqueous equilibrium countercurrent extraction technique which obviously necessitates a very high solvent-to-leaves ratio resulting in a concentration that cannot be higher than 4 to 9% according to the efficiency of the extractors and the operating system therefor.

In contrast to these known practices, it has now been discovered that tea leaves can be extracted with water to a very high concentration and without sacrificing flavor, color and aroma characteristics. When fresh, dry tea leaves entering the extraction system are first contacted by a tea extract having a given concentration of solids, the surface coating of such tea leaves is leached out with no reabsorption during this contact and the concentration of the resulting tea extract can be as high as 32 to 34%, or higher. In effect, during this leaching out step, the fresh, dry tea leaves maintain their curled or crimped characteristics and only the surface coating thereof is removed. If a proper concentration of tea extract is used in the leaching out step, an enriched tea extract results without reabsorption.

It should be appreciated that the curled and crimped tea leaves still retain a certain amount of liquid coating film after the leaching out has taken place. This liquid coating film can be efficiently rinsed off with tea extract, and liquid reabsorption with accompanying uncurling and swelling of the tea leaves can be prevented if the rinsing operation is performed in a short time.

It should also be appreciated that during the first contact of the dry tea leaves with tea extract prior to leaching out, a reducing ambiance is helpful in minimizing the oxidation of volatile flavors and aromas present in the solids comprising the surface coating, especially at relatively high operating temperatures. For example, the tea leaves being leached out may previously be treated with gaseous $SO_2$ which is adsorbed thereon and released when contacted with the tea extract acting as the leaching agent, such release of the $SO_2$ generating the reducing ambiance.

The principal aspect of my invention relates to the discovery that the tea leaf solubles coating the surface of fresh, dry tea leaves and which contribute aroma and flavor, can be leached out by the use of a tea extract of given concentration and with avoidance of reabsorption of the surrounding tea extract by the leaves being treated, to wit, without danger of uncurling and swelling the said tea leaves. However, this basic feature of my invention is best utilized when the leaching out agent is a tea extract resulting from countercurrent equilibrium extraction of tea leaves in that such extract thus contains the inner solubles of tea leaves attributing to the desired astringency and body in a final tea brew. If a proper proportion of such extract is used in the leaching out step, then a complete conventional taste of a freshly brewed cup of tea is insured.

By combining leaching out and equilibrium extraction, as noted heretofore, the leaching out step may be conducted at a relatively low temperature which is desirable due to the volatile characteristics of the surface coating being leached out. On the other hand, the tea extract being used as the leaching agent can be produced at relatively high temperatures to insure that all of the desirable solubles within the tea leaves are extracted and to permit a more efficient extraction operation, for example, by reducing the number of extraction cells required in the equilibrium extraction phase. Furthermore, this tea extract can be evaporated to a desired concentration prior to use as leaching agent without seriously damaging any of the non-volatile components therein.

Reference is made to FIGURE 1, which is a flow diagram showing a preferred method for utilizing my invention. For convenience, the method is divided into two broad steps, A and B. Step B is a flow diagram of the well known countercurrent equilibrium batchwise extraction where the material to be extracted, in this case, tea leaves, proceeds from cell 1 to cell 5 and fresh solvent, in this case, water, proceeds from cell 5 to cell 1. During this countercurrent travel the tea leaves will extract progressively from cell 1 to cell 5 where they leave the system completely extracted, while the solvent increases in concentration of desired less volatile solubles gradually from cell 5 to cell 1, leaving cell 1 with a concentration of such solubles equal to the concentration of the solubles existing within the tea leaves to be extracted. Generally, this concentration is in the order of from 3 to 6% but never more than 10%, depending upon the number of cells and the temperature of the solvent. The preferred number of cells is up to five and with average temperatures in the cells ranging up to about 200–210° F., all of which conditions are well known in the art.

As previously noted in this specification, I have discovered that a dry film-like surface coating exists on tea leaves containing desired volatile solubles and actually constituting from about 30 to 50% of all solubles available in the tea leaves. In step A of FIGURE 1, fresh, dry tea leaves which have such coating thereon are contacted in a leaching tank 6 with a tea extract of given concentration coming from cell 1 of step B.

If necessary, the concentration of the extract coming from cell 1 is adjusted by evaporation in evaporator 7, for appropriate use as a leaching agent. Alternatively, concentration can be adjusted by adding soluble additives such as carbohydrates. This addition can be directly to the extract coming from cell 1 or it can be done by including such soluble additives in the fresh, dry tea leaves introduced in the leaching tank 6.

The concentration of this tea extract entering leaching tank 6 is governed by two variables, these being temperature and time of leaching. It should be borne in mind that concentration at a given temperature and for a particular period of time must be such that the tea leaves entering leaching tank 6, which are normally dry and in a curled, crimped or rolled condition, are maintained in such curled, crimped or rolled condition so long as they stay in the leaching tank.

The surface coating being leached out of the leaves dissolves very readily upon contact with the tea extract, the latter thereby increasing in concentration. The concentration of the desired final extract is only limited by the viscosity of the leaching agent contacting the curled leaves and by the efficiency of the apparatus designed for this operation. It should be stressed that the curled or crimped physical condition is maintained while the tea leaves are in leaching tank 6, not only to avoid absorption of the surrounding leaching agent, but in addition, to facilitate the contact between the leaves and the leaching agent. Also, percolation rate is increased due to the high percentage of voids that are provided by the crimped condition.

Reference is made to the following Table I, which lists temperature-concentration relationships for given periods of time. The time periods designated "uncurling" specify the length of time available for leaching at given combinations of temperature and concentration before absorption commences. The lapse of time between "uncurling" and "swelling" is the amount of time available for an optional rinsing operation described hereinafter. It can be appreciated that no specific ranges of time, temperature, and concentration can be set forth, being dependent upon the amount of tea leaves being leached and the time required for such leaching. For example, if a batch of tea leaves requires 14 minutes of leaching time, a temperature of 120° F. with a 25% solids content in the leaching agent, would be in order.

TABLE I

*Physical Changes of Darjeeling Tea Leaves When Immersed in Leaching Agent—Time, Temperature, Leaching Agent Concentration Relationship*

| Percent Solids in Leaching Agent | Time @ 120° F. | Time @ 160° F. | Time @ 180° F. |
| --- | --- | --- | --- |
| Pure Leaching Agent (water). | Uncurling, 1′—30″<br>Swelling, 3′—10″ | 0′—46″<br>2′—0″ | 0′—40″.<br>0′—55″. |
| 5% | Uncurling, 2′—20″<br>Swelling, 5′—35″ | 1′—25″<br>4′—15″ | 1′—10″.<br>1′—50″. |
| 10% | Uncurling, 3′—15″<br>Swelling, 9′—0″ | 2′—30″<br>6′—20″ | 1′—45″.<br>4′—40″. |
| 15% | Uncurling, 9′—50″<br>Swelling, 14′—15″ | 4′—15″<br>7′—10″ | 3′—10″.<br>6′—0″. |
| 20% | Uncurling, 12′—40″<br>Swelling, 16′—25″ | 5′—45″<br>9′—15″ | 3′—50″.<br>7′—15″. |
| 25% | Uncurling, 14′—20″<br>Swelling, 21′—30″ | 10′—45″<br>13′—20″ | 5′—45″.<br>8′—20″. |
| 30% | Uncurling, 28′—20″<br>Swelling, 34′—40″ | 12′—10″<br>21′—30″ | 7′—45″.<br>16′—30″. |
| 35% | Uncurling, 43′—20″<br>Swelling, Negative ¹ | 21′—45″<br>Negative ¹ | 10′—30″.<br>1 Hr. 43′—0″. |
| 40% | Uncurling, 1 Hr. 16′—0″.<br>Swelling, Negative ¹ | 36′—20″<br>Negative ¹ | 18′—30″.<br>2 Hr. 40′—0″. |

¹ Negative in 3 hr. standing.

After the final extract is drained from the leaching tank 6, the tea leaves, which are still in a curled or crimped condition, may be rinsed to remove residual final extract left on the surface thereof. Rinsing can be carried out in rinsing tank 8 and preferably with extract coming from cell 1, which, of course, is of a lesser concentration than the residue on the leaves. In this manner, the efficiency of the entire operation is enhanced, since the extract going into leaching tank 6 includes any surface solubles that might have been left on the previously leached tea leaves. The tea leaves removed either from tank 6 or 8, depending upon whether or not a rinsing step is utilized, are then transferred to cell 1 and thus enter the countercurrent equilibrium extraction phase.

The process shown in FIGURE 1 can, of course, be carried out in a batchwise manner necessitating the material transfer of the tea leaves from one tank to another. However, the process may be best carried out in a continuous manner by using appropriate equipment, a preferred modification of which being illustrated in FIGURES 2–4, and described hereinafter.

FIGURE 2 shows a countercurrent system of extraction cells 9, 11, 13, and 15. These cells have false bottoms 17, consisting of a screen through which the solvent passes after percolating past the bed of material 19. The solvent is collected in hoppers 21 from which it is conducted to receiving tanks 23 through pipes 25. The extraction cells are so positioned in the system that they are completely independent of the solvent inlets 27 and the solvent receiving receptacles 29. That is, the cells can be moved around in respect to the fixed points 27 and 29, for example, on a rotating platform, as illustrated in FIGURE 3.

Solvent flowing through pipe 25 into receiving tanks 23, is recirculated by pumps 31 through pipes 33 into the bed of tea leaves 19 and eventually back to the receiving tanks 23.

The depth of the material of the tea beds 19 determines the rate of circulation of the solvent and the friction losses through these tea beds is dependent upon the physical condition of the tea leaves, i.e., the friction losses being lower when the leaves are curled, and higher when they are flattened out by the adsorption of solvent. Friction loss is at least partially overcome by building a hydrostatic head above the tea leaf beds. For this purpose overflow outlets 35 are provided in the cells. The desired rate of overflow is determined by manipulating valve 37 and the desired temperature of the recirculating solvent is maintained by passage through heat exchanger 39.

To achieve the desired countercurrent equilibrium effect, fresh solvent, typically water, is introduced at 41 and after percolating through the tea leaf bed in tank 15, is collected in receiving tank 23. Assuming that the continuous process is already in operation, i.e., that the level of the tanks 23 has reached the overflow outlets 43 and that the concentration of the recirculating solvent is in equilibrium with the solvent in the leaves, a unit of solvent sent through inlet 41 and collected in receiving tank 23 will cause a similar unit quantity of solvent to overflow from one tank to another throughout the system and, hence, through outlet 45 to the leaching phase of the process.

It should be emphasized that the concentration of solvent contained in receiving tanks 23 is expected to be in equilibrium with the concentration of solids contained within the respective batches of tea leaves in the extraction cells 9, 11, 13, and 15. This concentration equilibrium is helped by the rapid recirculation of solvent throughout the tea leaf beds, as previously described.

When equilibrium is reached any further recirculation will, of course, be of no advantage so that at this point, the platform on which the cells are located is rotated. Cell 9 is then positioned in place of cell 11 and so forth. Cell 15 thus reaches the draining station 47, shown in FIGURE 3. In its course, it is rotated to the discharge station 49 then to loading station 51, where leached tea leaves coming from the leaching zone will be loaded. In the next revolution of the platform, cell 15 will reach the position formerly occupied by cell 9 and the equilibrium extraction cycle is repeated.

Each cell illustrated in FIGURE 2 may be provided with a removable basket 53 having a handle 55. Thus, when, for example, cell 15 reaches unloading point station 49, the basket may be lifted manually, emptied, and replaced in cell 15, so that when the loading station 51 is reached, the leached tea leaves are readily placed thereon.

It should be emphasized that the above-described apparatus for achieving continuous countercurrent equilibrium extraction is subject to numerous modifications readily apparent to those skilled in the art. Furthermore, such continuous system must, of course, first be primed or put in equilibrium before the process can be considered "on-stream." Such techniques are likewise readily apparent to those skilled in the art.

Turning to FIGURE 4, illustrated therein is a combination leaching and rinsing continuous apparatus represented schematically in FIGURE 1 as 6 and 8. The apparatus consists of a screw conveyor 57 having a lower portion 59 consisting of perforated metal. Surrounding the perforated portion 59 is a collection box 61 in which the extract percolates past fresh tea leaves 63, through the perforated portion 59 and then collected and conveyed through pipe 65 to pump 67.

A feeding hopper 69 is situated above a portion of conveyor 57. The feeding hopper is continuously receiving measured amounts of fresh tea leaves by means of a second conveyor 71, through the inlet 73. Collection box 61 is provided with a baffle 75 adjacent outlet pipe 77 connected to the suction side of the pump 67. This baffle 75 separates the collection box 61 into two independent compartments 79 and 81. The compartment 79 is also connected to the pump 67 by means of the pipe 77.

In operation, the concentrated extract coming from pipe 45 of FIGURE 2 enters the conveyor 57 at 83 where rinsing of the leached tea leaves takes place. The rinsing liquid percolates through the leached leaves and then by perforated section 59 into compartment 79. This rinsing liquid is then pumped through pipe 77 into hopper 69 at the inlet 85 and is sprayed on the bed of dry tea leaves where leaching of such leaves is carried out. The liquid percolates through the bed of tea leaves past the perforated section 59 of conveyor 57 into compartment 81. Then it is pumped by pump 67 into recirculation through inlet 85 back to hopper 69. This is a continuous process governed by the height of overflow outlet 87 through which the final product emerges when the height of the liquid in the compartment 81 reaches outlet 87.

It should be understood that conveyor 57 continuously conveys tea leaves from the leaching zone through the rinsing zone and out at 89 from where the leached and rinsed tea leaves are conveyed to the counter-current equilibrium system. In this respect, conveyor drive means 91 and 93 of conveyors 57 and 71, respectively, are synchronized as to provide for equal amounts of dry tea leaves entering hopper 69, as leached and rinsed tea leaves are removed at 89. Thus, a constant depth of tea leaves is provided in the leaching zone.

My invention is more fully illustrated by the following specific examples.

EXAMPLE 1

Fresh, dry Darjeeling tea leaves (one hundred pounds) in curled and crimped condition were subjected to leaching in a leaching tank of the continuous type illustrated in FIGURE 4. The curled and crimped leaves were treated with a tea extract from an equilibrium extraction phase to be described, and including rinse liquid from previously leached tea leaves. The concentration of this leaching liquid was 15% tea solids and the leaching step was carried out under atmospheric pressure and at a temperature of 120° F. The speed of the conveyor 91 of FIGURE 4 was so regulated that the resident time of the tea leaves in the leaching section was of a time period of nine minutes and fifty seconds. The concentration of the tea extract after leaching was determined to be 28% tea solids and included both the surface coating of the fresh tea leaves introduced into the leaching vessel and the non-volatile solids obtained from within the tea leaves in the equilibrium extraction phase.

The equilibrium extraction process was of the type described in FIGURES 2 and 3. The extraction vessels were jacketed stainless steel kettles and already "on stream." In the first cell, leached tea leaves still in the crimped and curled state were treated with dilute extract from the second cell containing 4 to 5% tea solids. The extraction continued for three minutes at an average temperature of 160° F. The leaves were then extracted in the second cell under similar conditions and for a similar time period, using tea extract from the third cell of 3 to 4% tea solids concentration. The extraction process was continued to the end cell wherein plain water was used as the extracting liquid.

The tea concentrate emerging from the first cell was of a tea solids concentration of approximately 10% solids. The tea extract was then pumped to a rinsing zone as shown in FIGURE 4 where it rinsed a previously leached batch of tea leaves, as noted heretofore. The rinsing time was less than five minutes and forty-five seconds at a temperature of 120° F. as shown in Table I. The extract (15% solids) was then used to leach fresh, dry tea leaves in a manner described previously and the rinsed leaves, still in the crimped and curled condition were transferred to the first extraction cell.

The final tea extract from the leaching zone contained in concentration of 28%, both the solubles on the surface coating of tea leaves and the solubles from within such leaves to yield, when reconstituted to beverage tea strength with water, a tea brew having aroma, color, flavor and body comparable to those of freshly brewed tea.

EXAMPLE 2

The process of Example 1 was carried out, except that the fresh, dry tea leaves being introduced into the leaching tank were first treated with gaseous $SO_2$ which was adsorbed thereon. When the leaching agent from the rinsing tank (at 120° F.), contacted these so treated tea leaves, the adsorbed $SO_2$ gas was released and thereby generated a reducing ambiance in the mass being leached. For the one hundred pounds of tea leaves, $SO_2$ gas was passed therethrough for a period of three minutes during which two cubic feet of $SO_2$ at atmospheric pressure was injected. The reducing ambiance in the mass was sufficient to substantially obviate oxidation of volatile flavors and aromas present in the surface solubles being leached out.

EXAMPLE 3

The process of Example 1 was carried out, except that the concentration of the leaching liquid was 25% solids and the leaching step was carried out at a temperature of 160° F. for a time period of ten minutes and forty-five seconds. The concentration of the tea extract after leaching was determined to be 38% solids.

The tea extract from the equilibrium extraction phase had veen evaporated to a concentration of 15% solids. To this was added sufficient corn syrup solids to make up a total concentration of 25% solids. The concentrated tea extract, following rinsing was 30% tea and corn syrup solids and was then used to leach fresh, dry tea leaves in a manner described heretofore. As noted, a rinsing operation was first carried out at a temperature of 160° F. and involving a time period of nine minutes and twenty seconds, as shown in Table I.

It should be noted that the final product obtained in accordance with the foregoing can be subjected to further processing in a conventional drum drier or spray drier to obtain a powdered "instant tea." Standard techniques are contemplated.

With regard to the foregoing description of my invention, it should be emphasized that the term "tea leaves" can and does include a blend of various varieties of such leaves. Furthermore, the use of various additives, such as carbohydrates and corn syrup to control and achieve optimum concentrations of extracts used in the process is also contemplated.

As noted heretofore, although preferred temperatures, times, concentrations, and the like have been disclosed, broader ranges thereof are often envisaged. It must be understood that the invention is not limited to preferred ranges so long as the desired results are effected. The invention includes all variations in procedures covered by the appended claims and their equivalents.

I claim:

1. A process for producing a highly concentrated, fully flavored tea extract from tea leaves which comprises supplying quantities of tea leaves in a crimped and curled condition and from which soluble surface solids have been leached, successively subjecting said leached tea leaves to an aqueous countercurrent equilibrium extraction thereby obtaining a tea extract containing the less volatile solubles from within the tea leaves and at a concentration of at least 10% solids, treating quantities of fresh, dry tea leaves in a crimped and curled natural condition with said concentrated tea extract at a temperature not greater than 200° F. and for a time sufficient to leach out the soluble surface solids on said fresh, dry tea leaves while maintaining said crimped and curled condition, thereby yielding as an end product a highly concentrated tea extract of enhanced flavor, color and aroma characteristics.

2. A process as claimed in claim 1 wherein said fresh, dry tea leaves have first been treated with sulphur dioxide for a time period sufficient to adsorb the same in the said tea leaves, and wherein said so adsorbed sulphur dioxide is released during leaching to thereby create a localized reducing ambiance and prevent oxidation of volatile tea compounds.

3. A process as claimed in claim 1 wherein the solids content of said tea extract obtained by aqueous countercurrent equilibrium extraction is increased by the addition of a soluble carbohydrate before application thereof to the fresh, dry tea leaves.

4. A process as claimed in claim 1 wherein said fresh, dry tea leaves are subjected to rinsing following leaching, the rinsing agent used being tea extract from the aqueous countercurrent equilibrium extraction.

5. A process as claimed in claim 1 wherein countercurrent equilibrium extraction is carried out at temperatures of up to 210° F.

References Cited in the file of this patent

UNITED STATES PATENTS

| | | |
|---|---|---|
| 2,785,979 | Mitchell | Mar. 19, 1957 |
| 2,902,368 | Seltzer et al. | Sept. 1, 1959 |
| 2,912,334 | Wetherilt | Nov. 10, 1959 |
| 2,927,860 | Seltzer et al. | Mar. 8, 1960 |